United States Patent [19]

Stymne

[11] Patent Number: 5,777,203
[45] Date of Patent: Jul. 7, 1998

[54] METHOD AND DEVICE FOR GAS EMISSION

[76] Inventor: Hans Stymne, Idungatan 7, Gavle S-802 67, Sweden

[21] Appl. No.: 700,466

[22] PCT Filed: Feb. 16, 1995

[86] PCT No.: PCT/SE95/00162

§ 371 Date: Aug. 15, 1996

§ 102(e) Date: Aug. 15, 1996

[87] PCT Pub. No.: WO95/22747

PCT Pub. Date: Aug. 24, 1995

[30] Foreign Application Priority Data

Feb. 17, 1994 [SE] Sweden ................... 9400538

[51] Int. Cl.$^6$ ................... G01M 3/20; G01F 25/00
[52] U.S. Cl. ................... 73/1.04; 73/1.05; 73/40.7; 210/640
[58] Field of Search ................... 73/1 G, 1 R, 40.7, 73/1.04, 1.05; 210/640; 261/96, 99, 102, 104, 105, 107

[56] References Cited

U.S. PATENT DOCUMENTS

| | | | |
|---|---|---|---|
| 3,209,579 | 10/1965 | Roberts | 73/1 G |
| 3,516,278 | 6/1970 | Klien et al. | 73/1 G |
| 3,824,836 | 7/1974 | Lyshkow | 73/1 G |
| 3,854,894 | 12/1974 | Kloss et al. | 261/104 |
| 3,968,675 | 7/1976 | Briggs | 73/1 G |
| 4,016,743 | 4/1977 | Henderson et al. | 73/1 R |
| 4,018,077 | 4/1977 | Leach | 73/1 G X |
| 4,063,446 | 12/1977 | Fuhrmann | 73/1 G |
| 4,172,378 | 10/1979 | Limp | 73/1 G |
| 4,419,882 | 12/1983 | Ishii et al. | 73/40.7 |
| 4,445,364 | 5/1984 | Stieff et al. | 73/40.7 |
| 4,493,207 | 1/1985 | Dempsey | 73/40.7 |
| 4,769,122 | 9/1988 | Morrese et al. | 204/408 |
| 4,820,648 | 4/1989 | Caprioli | 436/89 |
| 4,883,597 | 11/1989 | Perlman | 210/640 |
| 5,085,499 | 2/1992 | Griffin et al. | 356/311 |
| 5,199,295 | 4/1993 | Mettes | 73/1 G |

FOREIGN PATENT DOCUMENTS

| | | | |
|---|---|---|---|
| 1310649 | 10/1962 | France. | |
| 1343219 | 10/1963 | France. | |
| 27 02 002 | 7/1978 | Germany. | |
| 222923 | 11/1981 | Germany | 73/1 G |

OTHER PUBLICATIONS

H. Stymne et al, "A New Passive Tracer Gas Technique for Ventilation Measurements", *Proceedings of 12th AIVC (Air Movement and Ventilation Control Within Buildings) Conference*, 24–27 Sep. 1991, Ottawa, Canada, vol. 3, cover page and pp. 1–17.

"Permeation and Diffusion Devices–for the calibration of air monitoring equipment", *Thermedics Inc.*, cover and back pages and pp. 5, 6, and 13–15, published by Dec. —1996.

H. Stymne et al, "Measuring Ventilation Rates in the Swedish Housing Stock", *Building and Environment*, vol. 29, No. 3, 1994, pp. 373–379.

"Electric Analytical Method" *Patent Abstracts of Japan* Gep P1272, vol. 15, No. 435 Abs pub date Nov. 6, 1991 (3–181850).

*Primary Examiner*—Thomas P. Noland
*Attorney, Agent, or Firm*—Michaelson & Wallace; Peter L. Michaelson; John C. Pokotylo

[57] ABSTRACT

A method and a device for emitting small volumes of gas from a substance in condensed form to the surroundings at a controllable rate. The condensed substance is in a container which is in communication with the surroundings via a gas permeable membrane and a capillary. The geometry of the capillary determines the rate of emission of the gas to the surroundings.

8 Claims, 1 Drawing Sheet

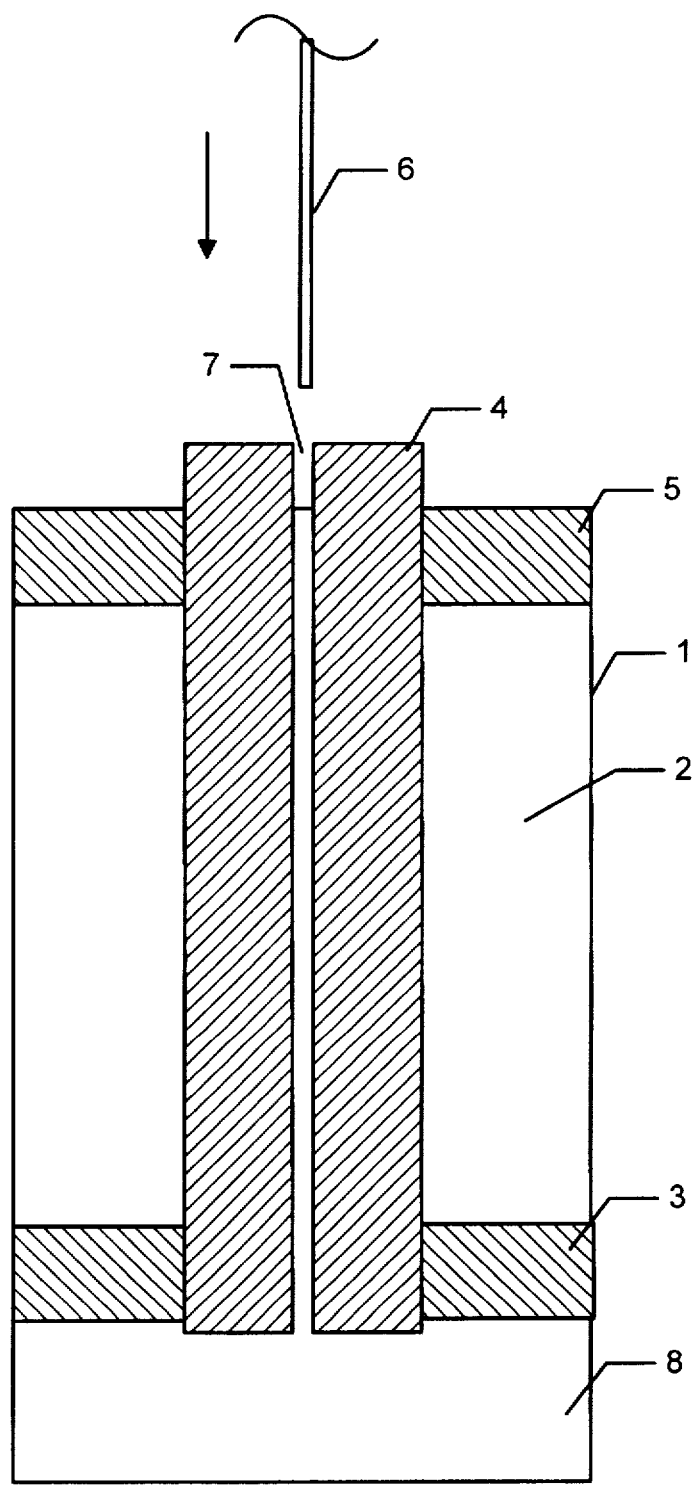

5,777,203

METHOD AND DEVICE FOR GAS EMISSION

FIELD OF INVENTION AND PRIOR ART

My invention is related to a method and a device for emission of small amounts of tracer gas to the surroundings in a controlled manner. The application primarily intended is in the so called passive tracer gas technique for ventilation measurements. However, there are other applications—for instance for production of calibration gases for analysing instruments, for studying flow patterns in chemical reactors or for studying spreading of contaminations.

Description of the Problem with Passive Tracer Gas Sources

A passive tracer gas source is a container emitting small amounts of gas to the air at a constant rate. In ventilation measurement, such tracer gas sources are placed in the premises together with samplers for the air. Analysis of the sampler then gives a value with respect to the concentration of tracer gas in the air. The ventilation in the premises can be calculated based upon the concentration. The technique itself is well established and has been used for thousands of ventilation measurements.

In a new variant of the technique, which I have proposed and developed, it is required that the rate of emission of tracer gas can be controlled and adapted to the size of rooms in the building, where the ventilation is to be determined. If this technique can be put into practice, it will involve a major improvement of the ventilation measurement technique. The new technique is called homogeneous emission technique and is internationally published by me.

Until about two years ago tracer gas sources for ventilation measurements were based on storage of the tracer substance in a container in a flowing form, said container being closed by means of a membrane which is permeable to the gas form tracer substance. It was also that type which I used at the beginning The greatest problem with this type of "permeation source" is that the rate of emission cannot be changed and the emission cannot be stopped. Another problem is that it takes X very long time (several weeks) before the rate of emission has been stabilized for a newly produced source. Therefore, I produced tracer gas sources based upon a different technique—capillary diffusion—a technique which I now exclusively use. Capillary diffusion sources are also a well-known technique. They are used for making gas mixtures having a known concentration for calibration of various analysing equipment for example. The rate of emission of the capillary source may be controlled by selecting the dimensions of the capillary in a suitable way. This type of source stabilizes the rate of emission momentarily. By closing off the capillary, one can also inhibit the emission.

However, it turned out that also the capillary source involves problems. One of the problems is that air in the container is expanded on temperature increase, whereby the air, which is saturated with tracer gas, is pressed out through the capillary and increases the rate of emission in an incontrollable manner if the source is subjected to temperature variations. Another problem is that the gas may condensate In the narrow capillary, which involves a drastic change of the rate of emission. The letter problem becomes particularly dramatic if one tries to control the rate of emission by changing the dimension of the capillary by pushing down a metal wire in it. Therefore, I have not been able to use the capillary sources as variable sources as I intended in the beginning.

SUMMARY OF THE INVENTION

The object of the present invention is to provide a method and a device for emitting small amounts of gas from a substance in condensated form to the surroundings with controllable rate.

The invention which solved of the above mentioned problem involves placement of a membrane, which is permeable to the tracer gas but not to air, between the container having the tracer substance and the capillary. Thus, the capillary is not in direct communication with the space containing the tracer substance. The risk for temperature expansion as well as capillary condensation is eliminated and the rate of emission may easily be controlled by blocking parts of the capillary with for instance a metal wire. Thus, the invention solves a serious problem within the art of measuring for example.

SHORT DESCRIPTION OF THE DRAWING

In the following an example of a possible embodiment of the device according to the invention is given with the assistance of the enclosed drawing. However, the example should not be considered as a restriction of the method formulated hereinabove for emission of gas from a condensated substance.

In the drawing the sole FIGURE illustrates the device according to the Invention in a diagrammatical longitudinal section.

DETAILED DESCRIPTION OF THE PREFERRED EMBODIMENT

The description hereunder comprises only the central aspect of the invention.

The device illustrated in the drawing comprises a container 1. A space for a liquid, i.e. the condensated substance, is indicated with 2.

A permeable membrane is denoted 3 and a capillary tube 4. A seal is denoted 5. This is arranged between a wall of the container 1 and a capillary tube 4. The container 1 may for instance be formed by a tube, e.g. of aluminium.

The condensated substance is enclosed in the space 2, which is in communication with the surroundings by means of first the membrane 3, which is permeable to the gas, and then a capillary 7 formed in the capillary tube 4, the capillary 7 determines, by means of its geometry, the rate of emission of the gas to the surroundings.

The rate of gas emission from the capillary tube 4 is controllable by changing the dimension of the capillary. This dimensional change may be effected by means of a control member 6 introducable into the capillary 7. The control member 6 is formed by a wire or a rod.

The capillary tube 4 extends at least partially, preferably for the major part thereof, through the space 2 for the condensated substance. This design tends to act temperature equalizing as far as the temperatures of the space 2 and of the capillary tube 4 are concerned.

In the embodiment shown, the capillary tube 4 extends through the membrane 3. This means, accordingly, that the membrane 3 will act as a bridge between the capillary tube 4 and container 1.

The membrane 3 delimits a space 2 from a further space 8. The capillary tube 4 communicates with this further space 8 via one of its ends, namely the end which is opposite to the end which is in communication with the surroundings.

The membrane 3 may be arranged relatively close to an end of the container 1 so that the further space 8 is smaller than the space 2.

I claim:

1. A method for emission of small amounts of gas from a substance in condensated form to the surroundings with a controllable rate, characterized by enclosing the condensated substance in a container and emission of the condensated substance from the container to the surroundings via first a membrane (3), which is permeable to the gas, and then a capillary (7), the rate of emission of the gas to the surroundings being determined by means of the geometry of the capillary.

2. The method according to claim 1, characterized by controlling the rate of emission of the gas by means of a control member (6) introducable into the capillary (7).

3. A device for emission of small amounts of gas from a substance in condensated form to the surroundings with a controllable rate, characterized in that it comprises container (1, 2) for receiving the condensated substance and that the container is in communication with the surroundings first via a membrane (3), which is permeable to the gas, and then a capillary (7), which by means of its geometry determines the rate of emission of the gas to the surroundings.

4. A device according to claim 3, characterized in, that a capillary tube (4) defining the capillary (7) extends through a space (2), which is present in the container (1) and intended for the condensated substance.

5. A device according to claim 4, characterized in that it comprises a control member (6) introducable into the capillary (7) for controlling the rate of gas emission.

6. A device according to claim 3, characterized in that it comprises a control member (6) introducable into the capillary (7) for controlling the rate of gas emission.

7. A device according to claim 6, characterized in that the control member (6) comprises a wire or a rod.

8. The device of claim 3 wherein the capillary includes i) an inlet for accepting gas emitted from the membrane, and ii) an outlet for emitting gas to the surroundings.

* * * * *